US012789595B2

(12) United States Patent
Ehrmann et al.

(10) Patent No.: US 12,789,595 B2
(45) Date of Patent: Nov. 10, 2026

(54) MOTOR VEHICLE COMPRISING A ROOF RAIL, A WINDSHIELD, AND A ROOF MODULE

(71) Applicant: Webasto SE, Stockdorf (DE)

(72) Inventors: Maximilian Ehrmann, Stockdorf (DE); Magnus Sviberg, Stockdorf (DE); Cédric Langlais, Stockdorf (DE); Michael Hülsen, Stockdorf (DE)

(73) Assignee: WEBASTO SE

( * ) Notice: Subject to any disclaimer, the term of this patent is extended or adjusted under 35 U.S.C. 154(b) by 467 days.

(21) Appl. No.: 18/224,939

(22) Filed: Jul. 21, 2023

(65) Prior Publication Data

US 2024/0042835 A1 Feb. 8, 2024

(30) Foreign Application Priority Data

Aug. 2, 2022 (DE) .................... 10 2022 119 353 U

(51) Int. Cl.
*B60S 1/52* (2006.01)
*B60J 1/20* (2006.01)

(52) U.S. Cl.
CPC ............. *B60J 1/2005* (2013.01); *B60S 1/528* (2013.01)

(58) Field of Classification Search
CPC ........ B60J 1/2005; B60R 11/00; B60R 11/04; B60R 11/0258; B60R 2011/004;
(Continued)

(56) References Cited

U.S. PATENT DOCUMENTS 11,731,705 B2 * 8/2023 Friedrich ................ B60R 16/02 296/210
12,313,778 B2 * 5/2025 Schmidt ................ G01S 7/4813
(Continued)

FOREIGN PATENT DOCUMENTS

DE 102008033116 A1 * 3/2009 ................ B60S 1/52
DE 102015015910 B3 6/2017
(Continued)

OTHER PUBLICATIONS

German Office Action from a related Application No. DE 10 2022 119 353.5; mailed May 2, 2023; In German with Machine Translation into English (20 pages).
(Continued)

*Primary Examiner* — Wenwei Zhuo
(74) *Attorney, Agent, or Firm* — Fitch, Even, Tabin & Flannery, LLP

(57) ABSTRACT

A vehicle having at least one roof rail and window, the window connected to the roof rail, and a roof module for forming a vehicle roof of the motor vehicle. The roof module has a frame, connected to or partially forms the one roof rail, a panel component, which at least partially forms a roof skin of the vehicle roof, the roof skin serving as an outer sealing surface of the roof module, and which is connected to the roof module frame, an environment sensor configured to send and/or receive electromagnetic signals through a panel see-through area in the panel component so as to detect a vehicle environment, and a cleaning feature which has at least one cleaning nozzle and is configured to clean the see-through area. The at least one window and the roof module frame and/or the panel component overlap so that an installation space is formed.

19 Claims, 7 Drawing Sheets

(58) Field of Classification Search
CPC ........ B60R 2300/108; B60R 2300/301; G01D 11/245; G01D 11/30; B62D 37/02; B62D 25/06; B60S 1/52; B60S 1/528; B60S 1/02; B60S 1/56; B60S 1/46; B60S 1/54
USPC ..... 296/84.1, 180.1, 193.12, 29, 96.15, 210; 15/250.201, 250.361
See application file for complete search history.

(56) References Cited

U.S. PATENT DOCUMENTS

| | | | | |
|---|---|---|---|---|
| 2019/0161125 | A1* | 5/2019 | Schmidt | B60S 1/46 |
| 2021/0293933 | A1 | 9/2021 | Schmidt | |
| 2022/0089129 | A1* | 3/2022 | Krishnan | G01S 7/4813 |
| 2022/0169314 | A1 | 6/2022 | Huelsen | |
| 2022/0289146 | A1* | 9/2022 | Huelsen | B60S 1/56 |
| 2023/0219531 | A1* | 7/2023 | Bode | B05B 1/205 239/284.1 |
| 2024/0367618 | A1* | 11/2024 | Ehrmann | B60R 11/04 |
| 2024/0367619 | A1* | 11/2024 | Ehrmann | B60S 1/54 |

FOREIGN PATENT DOCUMENTS

| | | | |
|---|---|---|---|
| DE | 102019122193 | A1 | 2/2021 |
| DE | 102019122202 | A1 | 2/2021 |
| DE | 102020114479 | A1 | 12/2021 |

OTHER PUBLICATIONS

Office Action issued in corresponding Chinese Application No. 202310965062.5; date mailed: May 28, 2026; in Chinese with English machine translation (14 pages).

* cited by examiner

MOTOR VEHICLE COMPRISING A ROOF RAIL, A WINDSHIELD, AND A ROOF MODULE

CROSS-REFERENCE TO RELATED APPLICATION

This application claims priority from German Patent Application Number 10 2022 119 353.5, filed on Aug. 2, 2022, which is hereby incorporated herein by reference in its entirety for all purposes.

FIELD

The invention relates to a motor vehicle according to the preamble of claim 1. Furthermore, the invention relates to a motor vehicle according to the preamble of claim 2.

BACKGROUND

Generic motor vehicles are known from vehicle manufacturing. Such a motor vehicle usually comprises a roof rail, a windshield connected to the roof rail, and a roof module for forming a vehicle roof of the motor vehicle with a roof module frame connected to or at least partially forming the roof rail. Furthermore, motor vehicles are known in which partial areas of the roof skin are formed by a cover element. Such cover elements serve, for example, to conceal components disposed below the roof skin in the vehicle roof from the outside. In known motor vehicles, the roof module used is preferably prefabricated as a separate functional module and delivered to the assembly line during assembly of the vehicle. The roof module at least partially forms a roof skin of the vehicle roof, which prevents moisture or airflows from entering the vehicle interior. The roof skin is formed by one or more surface components, which can be made of a stable material, such as painted metal or painted or solid-colored plastic. The roof module may be a part of a rigid vehicle roof or a part of an openable roof sub-assembly.

Furthermore, the development in vehicle manufacturing is increasingly directed towards autonomously or semi-autonomously driving motor vehicles. In order to enable the vehicle control system to control the motor vehicle autonomously or semi-autonomously, a plurality of environment sensors (e.g., lidar sensors, radar sensors, (multi-)cameras, etc., including other (electrical) components) are used, which are integrated in the roof module, for example, so to detect the environment surrounding the motor vehicle and to determine a current traffic situation from the acquired environment data, for example. Roof modules that are equipped with a plurality of environment sensors are also known as roof sensor modules (RSM). The known environment sensors send and/or receive electromagnetic signals, such as laser beams or radar beams, allowing a data model of the vehicle environment to be generated by signal evaluation and used for vehicle control.

The environment sensors for monitoring and detecting the vehicle environment are usually attached to the vehicle roof since the vehicle roof is typically the highest point of a vehicle, from which the vehicle environment is easily visible. The environment sensors are usually mounted as an attachment on top of the panel component of the roof module forming the roof skin but can alternatively also be disposed in an opening of the roof module and be adjustable between a retracted position and a deployed position.

During the use of the environment sensor, there is a risk that a (partially) transparent see-through area, through which the environment sensor detects the vehicle environment, may become dirty or opaque to the environment sensor due to environmental conditions (e.g., weather). Cleaning nozzles are known to be used for cleaning the see-through area. The known cleaning nozzles are usually disposed statically on the roof skin in an area of the roof module or of the panel component, similar to spray nozzles of a window wiper system. The cleaning nozzles are therefore often disposed in a field of view of the environment sensor and protrude above the roof skin.

However, this arrangement of the cleaning nozzles is disadvantageous for several reasons. For example, the cleaning nozzles protruding from the roof skin often do not meet the aesthetic requirements of a vehicle design and can, for example, appear aesthetically unpleasing to a customer. Also, the cleaning nozzles act as disturbance variables in the field of view of the environment sensor due to their arrangement in front of the environment sensor and cause blind areas in which the environment sensor cannot perceive the vehicle environment with sufficient accuracy. Since these blind areas increase with increasing distance from the environment sensor due to trigonometric-optical relationships, "blind spot areas" in the field of view can arise for the environment sensor, which must be avoided. The known arrangement of the cleaning nozzles may also lead to aerodynamically disadvantageous noise behavior, which is caused by turbulent flow formation around the prominence of the cleaning nozzles and may be perceived as annoying by a passenger in an interior of the vehicle. The static arrangement of cleaning nozzles on the roof skin also means that the cleaning nozzles are exposed to stronger mechanical influences, e.g., during cleaning of the vehicle in a car wash, which has a detrimental effect on the service life. In addition, due to applicable safety standards, mounted components on a vehicle must meet further criteria. For example, protruding components must be provided with personal protection radii to prevent the risk of cuts and/or injuries. However, these additional requirements lead to increased manufacturing costs. In addition, the panel components on which such cleaning nozzles are to be disposed often have to be provided with complex cutouts, which entail a plurality of manufacturability problems, thus making production complex and expensive. Sealing problems also often occur in the transition area between the cleaning nozzles and the panel component. For instance, the seal between the cleaning nozzle in question and the panel component must always be designed in such a manner that water is prevented from entering the interior of the vehicle.

One solution known in automotive engineering is cleaning nozzles for vehicle lights and/or a windshield, which can be retracted and deployed in a vehicle body of the vehicle in front of the area to be cleaned, as seen in the direction of view. These cleaning nozzles are moved by means of a hydraulic drive, i.e., by means of a water pressure inherent in the cleaning nozzle. However, this system also has disadvantages since, for example, a separate water-pressure-based drive is required for each cleaning nozzle, for which additional installation space is needed. Furthermore, these hydraulic systems can only be moved along a predetermined direction, namely along a hydraulic path of the cleaning nozzle, which limits both a constructive flexibility and a freedom of design in placing the cleaning nozzles. Likewise, an initiation of the movement may be delayed due to a latency defined by a period of time required for a pressure build-up within the hydraulic drive system, which may be several seconds. Overall, these known drives for moving the cleaning nozzles comprise a number of disadvantages that also need to be overcome.

In addition, in the prior art, the known forms of cleaning nozzles are often driven by pure functionality without paying attention to a design and/or styling or an external appearance of the overall vehicle that is advantageous for the customer. For example, known cleaning nozzles often have a detrimental effect on the aerodynamics of the vehicle as a whole since the individual cleaning nozzles often act as aerodynamically interfering contours on the outer skin of the vehicle. In addition, a cleaning performance of cleaning nozzles disposed in a known manner is often negatively affected by the air flow occurring during operation of the vehicle. These disadvantages occur in particular when the cleaning nozzles are disposed in the roof area.

SUMMARY

Therefore, one object of the invention is to propose a motor vehicle which avoids the disadvantages of the prior art described above and in which the manner in which cleaning nozzles are disposed in the roof area of a vehicle is improved, in particular.

This object is attained by a motor vehicle according to the teaching of claim 1. Alternatively, this object is attained by a motor vehicle according to the teaching of claim 2.

Advantageous embodiments of the invention are the subject matter of the dependent claims. Also, any and all combinations of at least two of the features disclosed in the description, the claims and/or the figures fall within the scope of the invention.

The motor vehicle according to a first aspect of the invention comprises at least one roof rail, at least one window, in particular a windshield and/or a rear window and/or a side window, which is connected to the at least one roof rail, and a roof module for forming a vehicle roof of the motor vehicle. The roof module comprises a roof module frame connected to or at least partially forming the at least one roof rail. Furthermore, the roof module comprises a panel component at least partially forming a roof skin of the vehicle roof, the roof skin serving as an outer sealing surface of the roof module, and being connected to the roof module frame. The roof module comprises at least one environment sensor, preferably a plurality of (i.e., >1) environment sensors, configured to send and/or receive electromagnetic signals through a see-through area provided on or in the panel component so as to detect a vehicle environment. The roof module comprises a cleaning feature having at least one cleaning nozzle and being configured to clean the see-through area. The motor vehicle is characterized in that the at least one window, in particular a windshield, and the roof module frame and/or the panel component overlap in such a manner that an installation space is formed between the at least one window and the roof module frame and/or the panel component, said installation space being at least partially open in the direction of the see-through area, and the at least one cleaning nozzle being placed, preferably disposed, particularly preferably fastened, in said installation space, or in that a stepped portion is formed in or on the panel component, the at least one cleaning nozzle being attached to said stepped portion. The window is preferably disposed on the roof rail. It can be disposed on the roof rail laterally and/or from below and/or from above. The window is preferably disposed on the roof rail in a fixed and/or flush and/or overlapping manner.

The motor vehicle according to a second, alternative aspect of the invention comprises at least one roof rail, at least one cover element and a roof module for forming a vehicle roof of the motor vehicle. The roof module comprises a roof module frame connected to or at least partially forming the at least one roof rail. Furthermore, the roof module comprises a panel component at least partially forming a roof skin of the vehicle roof, the roof skin serving as an outer sealing surface of the roof module, and being connected to the roof module frame. The roof module comprises at least one environment sensor, preferably a plurality of (i.e., >1) environment sensors, configured to send and/or receive electromagnetic signals through a see-through area provided on or in the panel component so as to detect a vehicle environment. The roof module comprises a cleaning feature having at least one cleaning nozzle and being configured to clean the see-through area. The motor vehicle is characterized in that the at least one cover element and the roof module frame and/or the panel component overlap in such a manner that an installation space is formed between the at least one cover element and the roof module frame and/or the panel component, said installation space being at least partially open in the direction of the see-through area, and the at least one cleaning nozzle being placed, preferably disposed, particularly preferably fastened, in said installation space, or in that a stepped portion is formed in or on the cover element, the at least one cleaning nozzle being attached to said stepped portion. It is understood that the motor vehicle according to the second aspect may also comprise a window, in particular a windshield and/or a rear window and/or a side window, and the installation space for disposing the at least one cleaning nozzle may also be formed between the window and the cover element. It is preferred if the installation space is at least partially open in the direction of the see-through area. For example, the installation space can be formed between a rear window and a rear cover element.

The motor vehicle according to a third aspect of the invention comprises at least one roof rail, at least one window, in particular a windshield and/or a rear window and/or a side window, which is connected to the at least one roof rail, and a roof module for forming a vehicle roof of the motor vehicle. The roof module comprises a panel component at least partially forming a roof skin of the vehicle roof, the roof skin serving as an outer sealing surface of the roof module, and being connected to or disposed on at least one roof rail. The roof module comprises at least one environment sensor, preferably a plurality of (i.e., >1) environment sensors configured to send and/or receive electromagnetic signals through a see-through area provided on or in the panel component so as to detect a vehicle environment.

The roof module comprises a cleaning feature having at least one cleaning nozzle and being configured to clean the see-through area. The motor vehicle is characterized in that the at least one window, in particular a windshield, and the roof rail and/or the panel component overlap in such a manner that an installation space is formed between the at least one window and the roof rail and/or the panel component, said installation space being is at least partially open in the direction of the see-through area, and the at least one cleaning nozzle being placed, preferably disposed, particularly preferably fastened, said installation space, or in that a stepped portion is formed in or on the panel component, the at least one cleaning nozzle being attached to said stepped portion.

The motor vehicle according to a fourth, alternative aspect of the invention comprises at least one roof rail, at least one cover element and a roof module for forming a vehicle roof of the motor vehicle. The roof module comprises at least one panel component at least partially forming a roof skin of the vehicle roof, the roof skin serving as an outer sealing surface of the roof module, and being connected to and/or disposed on the roof rail. The roof module comprises at least one environment sensor, preferably a plurality of (i.e., >1) environment sensors, configured to send and/or receive electromagnetic signals through a see-through area provided on or in the panel component so as to detect a vehicle environment. The roof module comprises a cleaning feature having at least one cleaning nozzle and being configured to clean the see-through area. The motor vehicle is characterized in that the at least one cover element and the roof rail and/or the panel component overlap in such a manner that an installation space is formed between the at least one cover element and the roof rail and/or the panel component, said installation space being at least partially open in the direction of the see-through area, and the at least one cleaning nozzle being placed, preferably disposed, particularly preferably fastened, in said installation space, or in that a stepped portion is formed in or on the cover element, the at least one cleaning nozzle being attached to said stepped portion.

All illustrative examples and embodiments mentioned herein refer to all four mentioned aspects of the invention in the same or at least analogous manner without being mentioned separately for each aspect. For example, it is understood that the roof module frame is merely an optional component of the roof module. The roof module may also be formed without a roof module frame, in which case the panel component is preferably disposed directly or indirectly on and/or connected to the roof rail.

The inventors have recognized that it is constructively advantageous to place the at least one cleaning nozzle below a step formed according to the invention, which results from the overlap and/or from the integrally formed stepped portion. Due to this placement, the at least one cleaning nozzle disappears from the field of view, which is advantageous from an aesthetic point of view. When placed in this manner, the at least one cleaning nozzle is also no longer subject to any external mechanical stress. According to the invention, the at least one cleaning nozzle is thus better integrated and protected from external influences, such as ice scrapers, car washes and/or people. Likewise, the cleaning nozzles no longer have to comply with personal safety standards since their placement means that they no longer pose an openly accessible hazard. Thus, the at least one cleaning nozzle is no longer directly visible and does not interfere with the field of view of the environment sensor. According to the invention, such a step is particularly advantageously provided between the window, in particular the windshield, i.e., the front window, and the panel component and/or between the cover element (if present) and the panel component and/or between the rear window and the panel component or a rear cover element. According to the invention, the step can be also formed by providing an in particular integrally formed stepped portion on the panel component and/or the cover element. A further advantage of the placement of the cleaning nozzles according to the invention is that no more apertures and/or openings are required in the panel component and/or the cover element for installing the cleaning nozzle(s) when assembling the roof module. This makes it simpler and cheaper to manufacture the components concerned. Also, the number of sealing points can be reduced compared to the prior art. In addition, the mounting surface(s) existing in the installation space or on the stepped portion for mounting the cleaning nozzle(s) does/do not form a visible surface. Here, the at least one cleaning nozzle can be fastened in the installation space or on the stepped portion from the inside. This also minimizes the sealing problem existing in the prior art. By providing the installation space and/or the stepped portion, the penetration of moisture into an opening through which the cleaning nozzle is inserted is already reduced by purely structural means. After all, if the at least one cleaning nozzle is fastened in the installation space, the latter is covered from the outside with the result that a direct ingress of moisture is not possible. If the at least one cleaning nozzle is attached to the stepped portion, its outer surface is oriented at an angle with respect to the roof skin with the result that a direct ingress of moisture, in particular rainwater, is prevented in this case, as well. The direction in which the installation space is at least partially open is additionally oriented opposite to the direction of travel with the result that it is more difficult for rain to fall in. The placement of the at least one cleaning nozzle in the installation space or on the cover according to the invention allows installation space to be saved in a longitudinal vehicle direction and, in case of a lateral placement of the at least one cleaning nozzle, in a vehicle width direction since the at least one cleaning nozzle can be disposed, for example, partly on the window or the cover element and partly on a support profile and/or on the roof rail and/or on the roof module frame. This manner of disposing the at least one cleaning nozzle also makes it possible, for example, to use cleaning nozzles with different cleaning fluids without the cleaning fluids interfering with each other. In this manner, a better cleaning effect can be achieved.

As used herein, the term "overlap" is understood to mean that two surface portions overlap or are superimposed. A surface portion of the window and/or a surface portion of the cover element can preferably overlap a surface portion of the roof module frame and/or a surface portion of the panel component. Preferably, the surface portion of the window and/or the surface portion of the cover element has/have a predetermined distance to the surface portion of the roof module frame and/or the surface portion of the panel component at least in the area of overlap, said distance preferably defining an in particular vertical height of the installation space. The opposing surface portions preferably delimit the resulting installation space in two spatial directions. A width of the installation space, preferably viewed in a longitudinal vehicle direction, is preferably defined by the overlap. A length of the installation space, preferably viewed in a vehicle width direction, is preferably limited by a width of the panel component at maximum. The installation space formed according to the invention is preferably open towards the see-through area or at least partially open; i.e., it can also be partially covered so that the at least one cleaning nozzle can clean the see-through area. The installation space preferably comprises a wall which extends at an angle, preferably essentially orthogonal, to the overlapping surface portions and prevents moisture from entering an interior of the roof module. The wall may preferably be formed by the panel component and/or by the cover element and/or by the roof module frame. The wall may preferably function as a mounting surface for the at least one cleaning nozzle. The cover element according to the invention serves, for example, to cover components disposed below the roof skin in the vehicle roof from the outside. The cover element preferably functions as part of the roof skin in addition to the panel component.

The roof rail according to the invention may, for example, be an in particular roof-side component of a vehicle body of the motor vehicle. The at least one roof rail may be, for example, a longitudinal body rail preferably oriented essentially (i.e., ±10%) parallel to a longitudinal vehicle direction. Alternatively or additionally, the at least one roof rail may be a body cross member, for example, which is preferably oriented essentially (i.e., ±10%) parallel to a vehicle width direction. The roof module frame is preferably formed by at least one, preferably multiple roof module rails. The roof module frame is preferably formed by a plurality of longitudinal rails and at least one transverse rail. The roof module frame is preferably used to attach the roof module to the vehicle body. A placement from above (top load), a placement from below (bottom load) or a lateral placement is possible. The roof module frame preferably serves to stiffen and increase the strength of the roof module. The roof module frame preferably serves as a mounting platform for further components, such as the at least one environment sensor and/or the at least one cleaning nozzle. The see-through area can be disposed on the panel component or embedded in it as a window or integrated in the panel component. Alternatively or additionally, the see-through area is formed by at least part of a sensor housing in which the at least one environment sensor is disposed. For example, the environment sensor including the sensor housing can also be disposed in an opening of the panel component in a retractable and deployable manner and/or be inserted through an opening in the panel component at least with a housing portion comprising the see-through area.

Alternatively, the at least one roof rail can be formed at least partially by a part of the roof module frame. In this case, it may be an extended roof module, for example, by which a vehicle body of the motor vehicle is completed in the roof area once the roof module has been disposed on the vehicle body. Such an extended roof module can, for example, be attached to A-, B-, C- and/or D-pillars of the vehicle body. The at least one roof rail preferably acts as a stiffening element between the A-, B-, C- and/or D-pillars. The extended roof module can also comprise other components of the vehicle body, such as parts of the A-, B-, C- and/or D-pillars.

The expression “at least one/one” as used herein means that the motor vehicle according to the invention may comprise one or more of the components in question. It is also understood that the motor vehicle may comprise multiple cleaning features according to further embodiments. Furthermore, it is understood that the motor vehicle may comprise multiple separate or adjacent (front) windows. “At least one environment sensor” means that the roof module may comprise one or more environment sensors. “At least one cleaning nozzle” means that the roof module may comprise one or more cleaning nozzles or one or more cleaning features with one or more cleaning nozzles. A field of view of the environment sensor preferably extends symmetrically about an optical axis of the environment sensor in the form of a cone having a sensor-specific cone aperture angle. It is understood that the roof module may also comprise multiple panel components. Likewise, it is possible in principle that multiple installation spaces and/or stepped portions according to the invention are formed on the roof module. For instance, such an installation space and/or a stepped portion can be provided at the front and rear (as viewed in the direction of travel).

The roof module according to the invention can form a unit in which devices for autonomous or semi-autonomous driving supported by driving assistance systems are integrated and which can be mounted on a vehicle body as a unit by a vehicle manufacturer. Furthermore, the roof module according to the invention can be a purely fixed roof or a roof including a roof opening system. Furthermore, the roof module may be configured for use in a passenger car or in a commercial vehicle. The roof module can preferably be provided as a structural unit in the form of a roof sensor module (RSM), in which the environment sensors are provided, so as to be inserted into a roof frame of a vehicle body as a suppliable structural unit.

In principle, the environment sensor of the roof module according to the invention can be designed in various ways and can in particular comprise a lidar sensor, a radar sensor, an optical sensor, such as a camera, and/or the like. Lidar sensors operate in a wavelength range of 905 nm or about 1550 nm, for example. A material in a see-through area of the environment sensor is preferably transparent for a wavelength range used by the environment sensor and is selected depending on the wavelength(s) used by the environment sensor.

According to a preferred embodiment, the at least one cleaning nozzle is connected or attached to the roof module frame or to the roof rail or to a vehicle carcass or to a vehicle body plate or to another body component or to the panel component within the installation space, in particular in a moisture-tight manner. The at least one cleaning nozzle may preferably pass through an opening in the roof module frame or the covered portion of the panel component within the installation space. The at least one cleaning nozzle may be screwed, glued and/or clamped in place, for example. The at least one cleaning nozzle is preferably sealed in a moisture-tight manner with respect to the roof module frame and/or the panel component. Proven sealing concepts can preferably be used for this purpose. Although it appears to be more complex in terms of production technology, the at least one cleaning nozzle can also be connected to or attached to the window and preferably be sealed with respect thereto, in particular in a moisture-tight manner.

According to a preferred embodiment, the at least one cleaning nozzle is inserted through at least one opening in the stepped portion and is attached at least to or with respect to an inner side of the stepped portion. The stepped portion is preferably an integral wall portion of the panel component or the cover element and provides a mounting surface for mounting the at least one cleaning nozzle. The stepped portion is preferably not visible from a frontal view of the motor vehicle. The stepped portion preferably has at least one opening through which the at least one cleaning nozzle can be inserted. The at least one cleaning nozzle is preferably sealed with respect to the stepped portion in a moisture-tight manner.

According to a preferred embodiment, the stepped portion forms a wall that is oriented at an angle with respect to the roof skin. An imaginary normal vector of the wall or the stepped portion preferably has an acute angle, for example 1° to 30°, with respect to an imaginary that runs parallel to the direction of travel. Thus, the wall is preferably not completely vertically oriented but is inclined opposite to the direction of travel so that rain is effectively prevented from falling on the wall.

According to a preferred embodiment, the at least one cleaning nozzle is configured to clean the at least one see-through area by means of an in particular gaseous and/or liquid cleaning fluid. In principle, cleaning of the see-through area with compressed air or another pressurized gas and/or a liquid, such as water or soapy water, is conceivable. A combination of gaseous and liquid cleaning is also conceivable.

According to a preferred embodiment, if the roof module frame at least partially forms the at least one roof rail, at least one reinforcing and/or stiffening beam with which the roof module frame is at least partially in contact or which is connected to the roof module frame is disposed in the roof area of the motor vehicle. This case preferably describes the extended roof module already described in more detail above, in which, for example, part of the vehicle body is comprised in the roof module frame. For additional stiffening, it can be advantageous in this case to provide a stiffening beam on the vehicle body. Such a stiffening beam preferably has no load-bearing function but merely serves to increase stiffness and strength and/or collision safety in the area of the passenger compartment of the motor vehicle.

According to a preferred embodiment, the at least one window protrudes over the at least one roof rail in such a manner that the at least one window and the roof module frame and/or the panel component overlap in particular surface-wise. This embodiment again serves to declare the term “overlap”. The window, which is preferably glued or overmolded or foamed to the roof rail, preferably protrudes over the roof rail so as to overlap the roof module frame and/or the panel component.

According to a preferred embodiment, the at least one cover element protrudes over the at least one roof rail in such a manner that the cover element overlaps the roof module frame and/or the panel component, in particular surface-wise.

According to a preferred embodiment, the window is glued to the roof rail or the panel component and/or attached thereto by overmolding and/or foaming. In addition, a plurality of other connection options between the vehicle body and the roof module, in particular the roof module frame and/or the panel component and/or the at least one window, are conceivable. A connection technique for connecting the individual components to one another is basically freely selectable. For example, gluing, screwing, bolting, soldering, welding, overmolding, injection molding, foaming and the like are conceivable alone or in any combination.

According to a preferred embodiment, the at least one cleaning nozzle is fastened directly in the installation space or to the stepped portion and/or indirectly, in particular via at least one support profile. The support profile preferably forms a mounting cover or a mounting attachment to which the at least one cleaning nozzle is attached or on which the at least one cleaning nozzle is integrally formed. The mounting cover or the mounting attachment is preferably covered by the cover element or the protruding window, meaning only a shaping of the cover element or the window is visible to an observer from the outside. The support profile or the mounting cover or the mounting attachment on which the at least one cleaning nozzle is disposed are preferably disposed one above the other. The cover element or the window preferably covers the support profile as a design cover. Thus, the at least one cleaning nozzle and/or further components of the cleaning feature are preferably covered in such a manner that they are no longer visible from the outside. The at least one support profile is preferably captively connected to the cover element or the window, for example by screwing and/or gluing and/or clipping and/or soldering and/or welding and/or injection molding and/or overmolding. The at least one support profile is preferably sealed with respect to the cover element or the window by at least one seal, moisture thus being prevented from entering an interior of the motor vehicle.

In a preferred embodiment, the at least one cleaning nozzle is disposed on a component in question in a moisture-tight manner so as to prevent moisture from entering between the cleaning nozzle and the relevant component.

In a preferred embodiment, the support component is attached to and/or disposed on and/or integrated in the panel component and/or to the cover element and/or to the roof module frame and/or to the roof rail. This makes it possible to save sealing interfaces. Furthermore, installation space and costs can be saved.

In a preferred embodiment, at least one water drain is disposed on or integrated in the support component and/or the roof module frame and/or the roof rail. This prevents rainwater and/or splash water and/or other moisture from flowing out of the installation space or the stepped portion. Preferably, the at least one water drain can be connected to a water gutter of a sun roof, as far as included in the motor vehicle. Water discharge via an A-, B-, C- and/or D-pillar is also possible.

In a preferred embodiment, the at least partially open installation space can be covered by a net. This allows cleaning by the at least one cleaning nozzle without the net disturbing a fluid jet. Particularly preferably, a mesh size and/or mesh shape of the net is adapted to a fluid cone and/or fluid jet of the at least one cleaning nozzle so as not to disturb it. Due to the net, the installation space is still at least partially open. However, penetration of foreign particles, such as dust, dirt and/or leaves and/or foliage, can be prevented. Alternatively or additionally, a movable flap and/or cover can be provided, which covers the at least partially open installation space at least temporarily. The flap and/or cover can be opened, for example, only when cleaning is to be carried out by the at least one cleaning nozzle. In this manner, too, penetration of foreign particles, such as dust, dirt and/or leaves and/or foliage, can be prevented.

Alternatively or additionally (and/or), the at least one cleaning nozzle is attached to and/or disposed on and/or injection-molded onto and/or injection-molded into the panel component and/or the cover element and/or the roof module frame and/or the roof rail and/or the relevant component is overmolded with the cleaning nozzle. The injection molding and/or overmolding can preferably be performed by means of injection die molding. Alternatively or additionally, the at least one cleaning nozzle may be comprised by the panel component and/or by the cover element and/or by the roof module frame and/or by the roof rail.

According to a preferred embodiment, the at least one cleaning nozzle is at least partially integral with the stepped portion and/or the panel component and/or the cover element and/or the roof module frame and/or the roof rail. Particularly preferably, an outwardly directed outer surface of the at least one cleaning nozzle is formed by the cover element. Part of the material of the panel component or the cover element can therefore be reinforced, for example in the area of the stepped portion, in such a manner that at least part of the at least one cleaning nozzle, for example a nozzle head, is formed thereby. A cleaning nozzle integrally formed in this manner can, for example, comprise a connection section on the inside, i.e., not on the outside, to which a supply channel for supplying cleaning fluid is connected. The supply channel can, for example, comprise a hose plugged onto the connection section. By integrally forming the cleaning nozzle on the stepped portion, an additional seal can be dispensed with.

According to a preferred embodiment, the at least one environment sensor comprises a lidar sensor and/or a radar sensor and/or a camera sensor and/or a multi-camera sensor and/or an ultrasonic sensor. Other sensors not explicitly mentioned here and used in the field of autonomous or semi-autonomous driving are also included herewith.

In a preferred embodiment, the at least one cleaning nozzle is disposed on the left and/or right side of the environment sensor, as viewed along an optical axis of the environment sensor. In this embodiment, at least two cleaning nozzles are preferably present, which are spaced apart from each other and are disposed in the installation space or on the stepped portion on both sides of the environment sensor, preferably symmetrically to the optical axis of the environment sensor. In this embodiment, it is possible to form an optimal area of overlap of the fluid cones and/or the fluid jets and/or the fluid spray areas since the fluid nozzles can preferably be mirror-symmetrically directed at the see-through area from both sides. Furthermore, it is possible, for example in the case of a large see-through area, to clean one half surface of the see-through area by means of one of the two cleaning nozzles and the other half surface of the see-through area with the other of the two cleaning nozzles.

According to a preferred embodiment, the overlap formed between the at least one window and the roof module frame and/or the panel component, and/or at least part of the stepped portion, and/or the at least one cover element functions as a wind deflector and/or as a wind deflecting element and/or as a spoiler at least on the outside. This can have a positive effect on the aerodynamic shape of the vehicle as a whole. In addition, such a solution corresponds to a predetermined styling and/or design of the overall vehicle. Particularly preferably, the at least one cleaning nozzle is disposed on and/or comprised by and/or integrated in the overlap and/or the roof module frame and/or the panel component and/or the stepped portion and/or the cover element in this embodiment. Particularly preferably, the at least one cleaning nozzle is mounted on and/or integrated in the cover element, for example, meaning the two parts can be supplied as an assembly unit. Preferably, at least one seal can be disposed between the cover element and an associated interface to the vehicle. The advantageous aspect of this configuration is that the cleaning nozzle is preferably provided as a standard component and does not have to have an aerodynamic design itself. After all, the aerodynamic function is preferably provided by the cover element or at least a part of the panel component or a part of the window. In other words, the cover element and/or the window can preferably be freely designed on the outside of the vehicle. This makes it possible, for example, to protect or shield the fluid cone and/or the fluid jet from an airstream. Likewise, a corresponding shaping can minimize soiling of the see-through area since dirt particles are deflected accordingly, for example. This reduces the need for cleaning of the see-through area to be cleaned, in particular at higher vehicle speeds. Overall, the cleaning effort can be reduced in this manner. As a result, a styling of the vehicle can be optimized. The aerodynamics of the vehicle as a whole can be adjusted by selecting and/or designing the cover in question. The cover element and/or the panel component and/or the window can preferably be configured to cover further connection components of the at least one cleaning nozzle and/or serve as installation space for disposing these components, e.g., valves, hoses, etc. It is understood that the installation space and/or the stepped portion can basically be provided in any place of the motor vehicle.

Of course, the embodiments and the illustrative examples mentioned above and yet to be discussed below can be realized not only individually but also in any combination with each other without departing from the scope of the present invention. Moreover, any and all embodiments and illustrative examples mentioned above and yet to be discussed equivalently or at least similarly relate to the roof module according to the invention without being mentioned separately in its context.

BRIEF DESCRIPTIONS OF THE DRAWINGS

Embodiments of the invention are schematically illustrated in the drawings and will be discussed as examples below.

DETAILED DESCRIPTION

Figure 1:
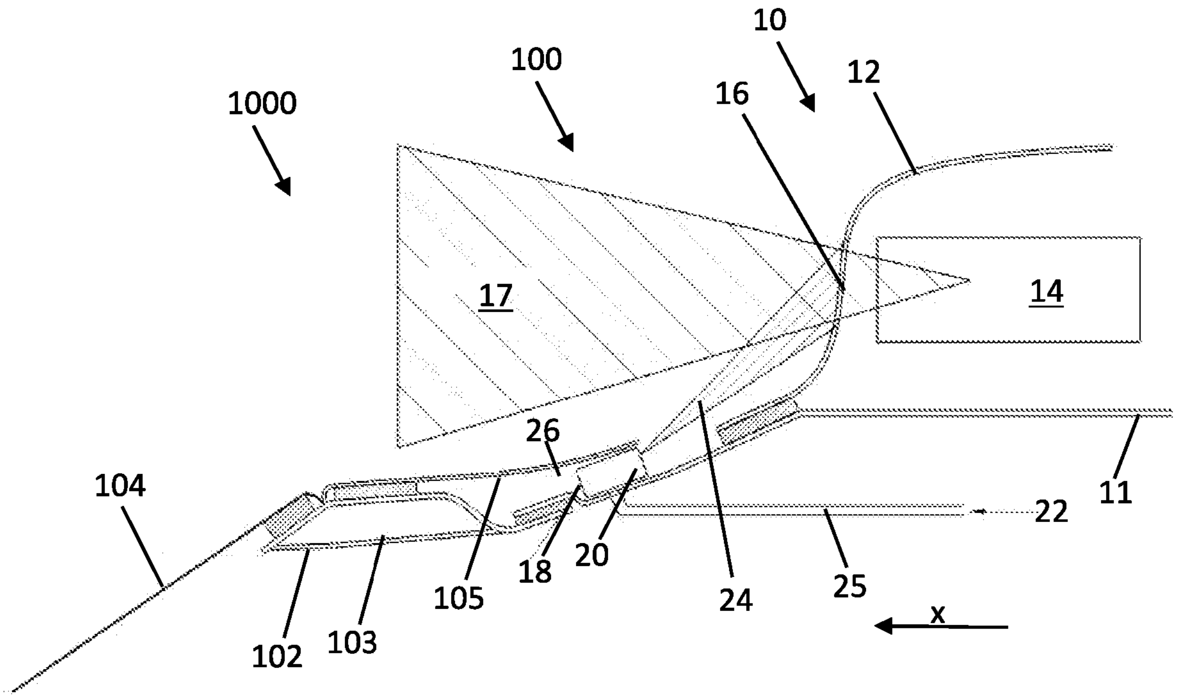
FIG. 1 shows a first exemplary embodiment of the vehicle according to the invention.

FIG. 1 shows a section of a vehicle roof 100 of a motor vehicle according to the invention (not shown completely). The motor vehicle comprises a roof rail 102. According to one possible embodiment, the roof rail 102 defines a frontal (as viewed in a longitudinal vehicle direction x) transverse rail 103 (see FIGS. 1, 3, 4 and 6). The in particular hollow-channel-shaped transverse rail 103 is oriented transversely, preferably orthogonally, to the longitudinal vehicle direction x. A vehicle width direction is orthogonal to the longitudinal vehicle direction x, i.e., perpendicular to an imaginary sheet plane in the Figures.

The motor vehicle further comprises at least one window 104, in this case a windshield. The windshield 104 is a front window in the case at hand. The motor vehicle according to the exemplary embodiments in FIGS. 1 to 3 also comprises a cover element 105. The cover element 105 forms part of the roof skin of the vehicle roof 100 and serves as an outer sealing surface which prevents moisture from entering an interior of the motor vehicle. The cover element 105 is present only in some embodiments of the invention and does not necessarily form part of the motor vehicle according to the invention.

The motor vehicle further comprises a roof module 10. The roof module 10 is preferably attached as a structural unit to at least a part of a vehicle body of the motor vehicle, for example to the transverse rail 103. The roof module 10 comprises a roof module frame 11. Via the roof module frame 11, the roof module 10 is preferably attached to the vehicle body, for example to the transverse rail 103 (see FIGS. 1, 3, 4, 6 and 7). Alternatively, the roof module frame 11 may at least partially form the at least one roof rail 102 (see FIGS. 2 and 5). In this case, it can be referred to as an extended roof module 10 in a simplified manner since the roof module 10 comprises components that are otherwise part of the vehicle body. If at least one of the roof rails 102 is formed by the roof module frame 11, it is advantageous if a reinforcing and/or stiffening beam 106 is provided, which preferably increases a structural rigidity of the motor vehicle in the roof area (see FIGS. 2 and 5).

The roof module 10 comprises a panel component 12 for forming a roof skin of the vehicle roof 100. An environment sensor 14 is disposed in a presently frontal region of the vehicle roof 100 or of the roof module 10 (viewed in a longitudinal vehicle direction x). The environment sensor 14 is disposed directly behind a front roof rail 102, which defines a header at the roof of the vehicle. In the case at hand, the environment sensor 14 is disposed in a mounting space formed between the panel component 12 and the roof module frame 11. The environment sensor 14 may also be mounted on an outer surface of the roof skin or on the panel component 12. The mounting space forms a dry area in which the environment sensor 14 is disposed in a moisture-proof manner. The environment sensor 14 is a lidar sensor in the case at hand. Other sensor types, e.g., (multidirectional) cameras used in (semi-)autonomous driving, can also be used.

In the panel component 12, a see-through area 16, for example in the manner of a window, is provided, which can for example be made of a preferably shatterproof plastic or another (partially) transparent material. The environment sensor 14 is aligned along an optical axis and configured to send and/or receive electromagnetic signals through the see-through area 16 in order to detect a vehicle environment within a sensor-specific field of view 17.

The roof module 10 further comprises at least one cleaning feature 18 with at least one cleaning nozzle 20. The at least one cleaning nozzle 20 is configured to clean the see-through area 16 by means of a gaseous and/or liquid cleaning fluid 22. For this purpose, the at least one cleaning nozzle 20 preferably sprays the cleaning fluid 22 onto the see-through area 16 from the outside in the form of a fluid cone 24. The cleaning fluid 22 is supplied to the at least one cleaning nozzle 20 via a supply line 25. Alternatively or in addition to a fluid cone, it can be a fluid jet and/or a fluid spray area, meaning the exemplarily selected cone shape is not to be understood as geometrically limiting.

According to the invention, the at least one windshield 104 and the roof module frame 11 or the panel component 12 overlap in such a manner that an installation space 26 is formed between the at least one windshield 104 and the roof module frame 11 (see FIG. 7) or between the at least one windshield 104 and the panel component 12 (see FIG. 6), the installation space 26 being at least partially open in the direction of the see-through area 16, and the at least one cleaning nozzle 20 being placed in the installation space 26. Alternatively, according to the invention, a stepped portion 28 is formed in the panel component 12, the at least one cleaning nozzle 20 being attached to the stepped portion 28 (see FIG. 4).

Alternatively, the at least one cover element 105 and the roof module frame 11 or the panel component 12 overlap in such a manner that an installation space 26 is formed between the at least one cover element 105 and the roof module frame 11 (see FIGS. 1 and 2) or between the at least one cover element 105 and the panel component 12 (see FIG. 3), the installation space 26 being at least partially open in the direction of the see-through area 16, and the at least one cleaning nozzle 20 being placed in the installation space 26.

In the following description, the individual embodiments and their structural specifics will be explicitly discussed once again.

According to FIG. 1, the windshield 104 is glued to the transverse rail 103, which forms the front header. The cover element 105 is disposed adjacent to the windshield 104 and glued to the transverse rail 103. The roof module frame 11 is glued to a connecting flange of the transverse rail 103. The panel component 12 is glued to the roof module frame 11. The cover element 105 is glued to the transverse rail 103 in such a manner that it is spaced apart from the roof module frame 11. This limits the height of the installation space 26. The installation space 26 is thus formed between the cover element 105 and the roof module frame 11. The cover element 105 limits the installation space 26 at the top. The roof module frame 11 limits the installation space 26 at the bottom. Furthermore, the installation space 26 is limited on one side by a part of the roof rail 102 or of the transverse rail 103 and is open in the direction of the see-through area 16. The cleaning nozzle 20 is disposed within the installation space 26 and oriented in the direction of the see-through area 16. For this purpose, the cleaning nozzle 20 is attached to the roof module frame 11, in particular inserted through an opening in the roof module frame 11. The cleaning nozzle 20 is sealed in a moisture-proof manner with respect to the roof module frame 11 and with respect to the cover element 105. In principle, other fastening methods for fastening the individual components to one another besides gluing are of course also possible.

Figure 2:
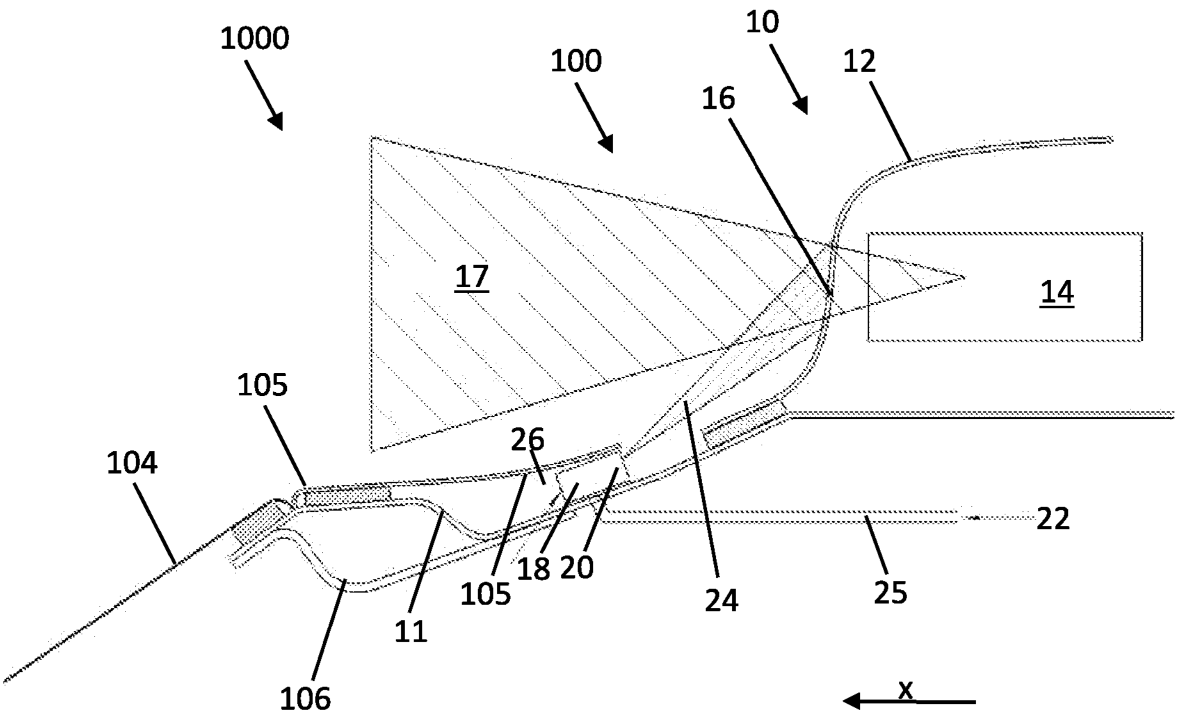
FIG. 2 shows a second exemplary embodiment of the vehicle according to the invention.

As shown in FIG. 2, the windshield 104 is glued to the roof module frame 11, which forms the front header in this case. The cover element 105 is disposed adjacent to the windshield 104 and glued to the roof module frame 11. The roof module frame 11 is connected to a reinforcing and/or stiffening beam 106 for stiffening. The panel component 12 is glued to the roof module frame 11. The cover element 105 is glued to the roof module frame 11 in such a manner that it is spaced apart from the roof module frame 11 in a free end region. This limits the height of the installation space 26. The installation space 26 is thus formed between the cover element 105 and the roof module frame 11. The cover element 105 limits the installation space 26 at the top. The roof module frame 11 limits the installation space 26 at the bottom and also on one side due to its geometric design. The installation space 26 is open in the direction of the see-through area 16. The cleaning nozzle 20 is disposed inside the installation space 26 and oriented in the direction of the see-through area 16. For this purpose, the cleaning nozzle 20 is attached between the cover element 105 and the roof module frame 11, in particular inserted through an opening in the roof module frame 11. The cleaning nozzle 20 is sealed in a moisture-proof manner with respect to the roof module frame 11 and with respect to the cover element 105. In principle, other fastening methods for fastening the individual components to one another besides gluing are of course also possible.

Figure 3:
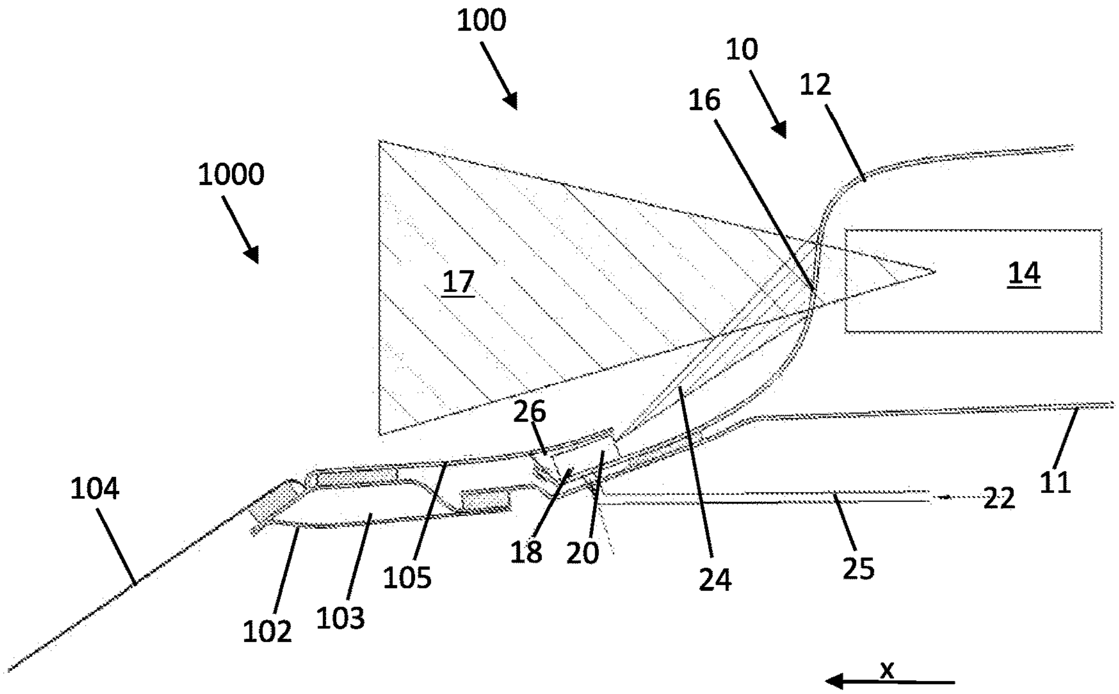
FIG. 3 shows a third exemplary embodiment of the vehicle according to the invention.

According to FIG. 3, the windshield 104 is glued to the transverse rail 103, which forms the front header. The cover element 105 is disposed adjacent to the windshield 104 and glued to the transverse rail 103. The roof module frame 11 is glued to a connecting flange of the transverse rail 103. The panel component 12 is glued to the roof module frame 11. The cover element 105 is glued to the transverse rail 103 and the panel component 12 is shaped in such a manner that the cover element 105 is spaced apart from the panel component 12 at a free end portion. This limits the height of the installation space 26. The installation space 26 is thus formed between the cover element 105 and the panel component 12. The cover element 105 limits the installation space 26 at the top. The panel component 12 limits the installation space 26 at the bottom. Furthermore, the installation space 26 is laterally limited by a specially shaped part of the panel component 12. The installation space 26 is open in the direction of the see-through area 16. The cleaning nozzle 20 is disposed within the installation space 26 and oriented in the direction of the see-through area 16. The cleaning nozzle 20 is attached to the panel component 12, in particular inserted through an opening in the panel component 12. The cleaning nozzle 20 is sealed in a moisture-proof manner with respect to the panel component 12 and with respect to the cover element 105. In principle, other fastening methods for fastening the individual components to one another besides gluing are of course also possible.

Figure 4:
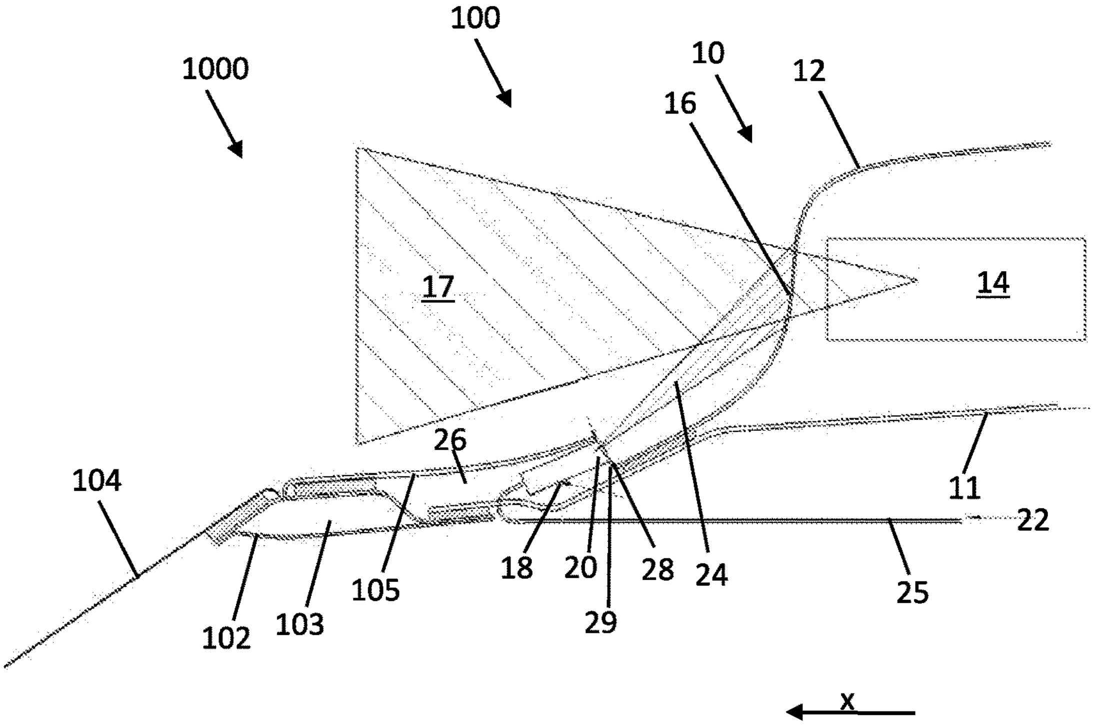
FIG. 4 shows a fourth exemplary embodiment of the vehicle according to the invention.

According to FIG. 4, the windshield 104 is glued to the transverse rail 103, which forms the front header. The panel component 12 is disposed adjacent to the windshield 104 and glued to the transverse rail 103. The roof module frame 11 is glued to a connecting flange of the transverse rail 103. The panel component 12 is further glued to the roof module frame 11. The panel component 12 is geometrically shaped to form the stepped portion 28. The at least one cleaning nozzle 20 is inserted through at least one opening in the stepped portion 28 and attached to at least one inner side 29 of the stepped portion 28. The stepped portion 28 forms a wall which is oriented at an angle with respect to the roof skin. The cleaning nozzle 20 is disposed on the stepped portion 28, in particular on the inner side 29 of the stepped portion 28. For this purpose, the cleaning nozzle 20 is attached to the panel component 12, in particular inserted through an opening in the panel component 12. The cleaning nozzle 20 is sealed in a moisture-proof manner with respect to the panel component 12 and with respect to the cover element 105. In principle, other fastening methods for fastening the individual components to one another besides gluing are of course also possible.

Figure 5:
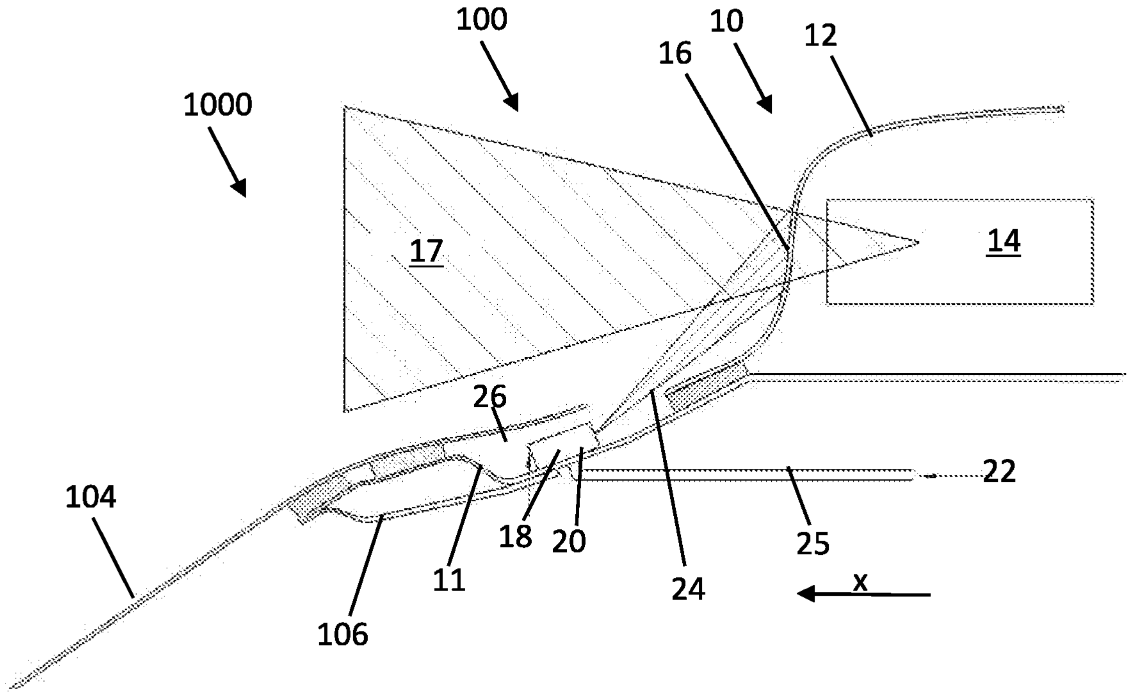
FIG. 5 shows a fifth exemplary embodiment of the vehicle according to the invention.

According to FIG. 5, the windshield 104 is glued to the roof module frame 11, which forms the front header in this case. In this case, the windshield 104 protrudes over the roof module frame 11 or over the mounting flange of the roof module frame which forms the roof rail 102. The roof module frame 11 is connected to a reinforcing and/or stiffening beam 106 for stiffening. The panel component 12 is glued to the roof module frame 11. The windshield 104 protrudes over the roof module frame 11 in such a manner that it is spaced apart from the roof module frame 11 in a free end region. This limits the height of the installation space 26. The installation space 26 is thus formed between the windshield 104 and the roof module frame 11. The windshield 104 limits the installation space 26 at the top. The roof module frame 11 limits the installation space 26 at the bottom and also on one side due to its geometric design. The installation space 26 is open in the direction of the see-through area 16. The cleaning nozzle 20 is disposed within the installation space 26 and oriented in the direction of the see-through area 16. The cleaning nozzle 20 is attached to the roof module frame 11, in particular inserted through an opening in the roof module frame 11. The cleaning nozzle 20 is sealed in a moisture-tight manner with respect to the roof module frame 11. In principle, other fastening methods for fastening the individual components to one another besides gluing are of course also possible.

Figure 6:
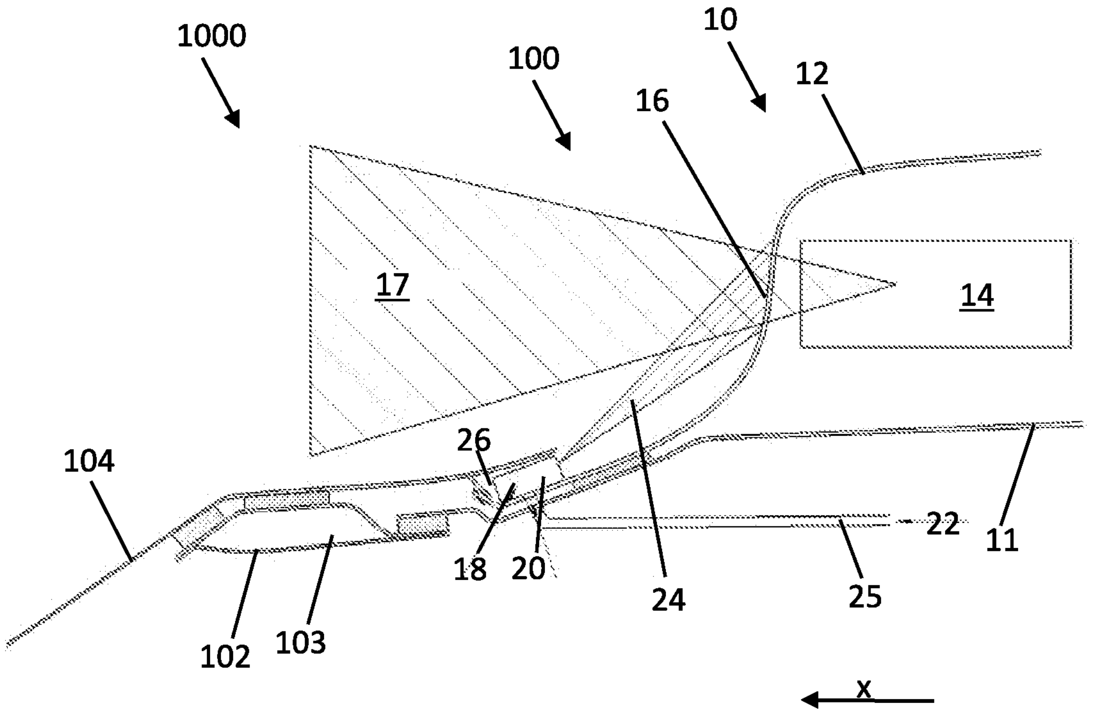
FIG. 6 shows a sixth exemplary embodiment of the vehicle according to the invention.

As shown in FIG. 6, the windshield 104 is glued to the transverse rail 103, which forms the front header. In this case, the windshield 104 protrudes over the transverse rail 103 or over the mounting flange of the transverse rail 103 on one side. The panel component 12 is glued to the roof module frame 11. The windshield 104 protrudes over the transverse rail 103 in such a manner that it is spaced apart from the panel component 12 in a free end area. This limits the height of the installation space 26. The installation space 26 is thus formed between the windshield 104 and the panel component 12. The windshield 104 limits the installation space 26 at the top. The panel component 12 limits the installation space 26 at the bottom and also on one side due to its geometric design. The installation space 26 is open in the direction of the see-through area 16. The cleaning nozzle 20 is disposed within the installation space 26 and oriented in the direction of the see-through area 16. The cleaning nozzle 20 is attached to the panel component 12, in particular inserted through an opening in the panel component 12. The cleaning nozzle 20 is sealed in a moisture-tight manner with respect to the panel component 12. In principle, other fastening methods for fastening the individual components to one another besides gluing are of course also possible.

Figure 7:
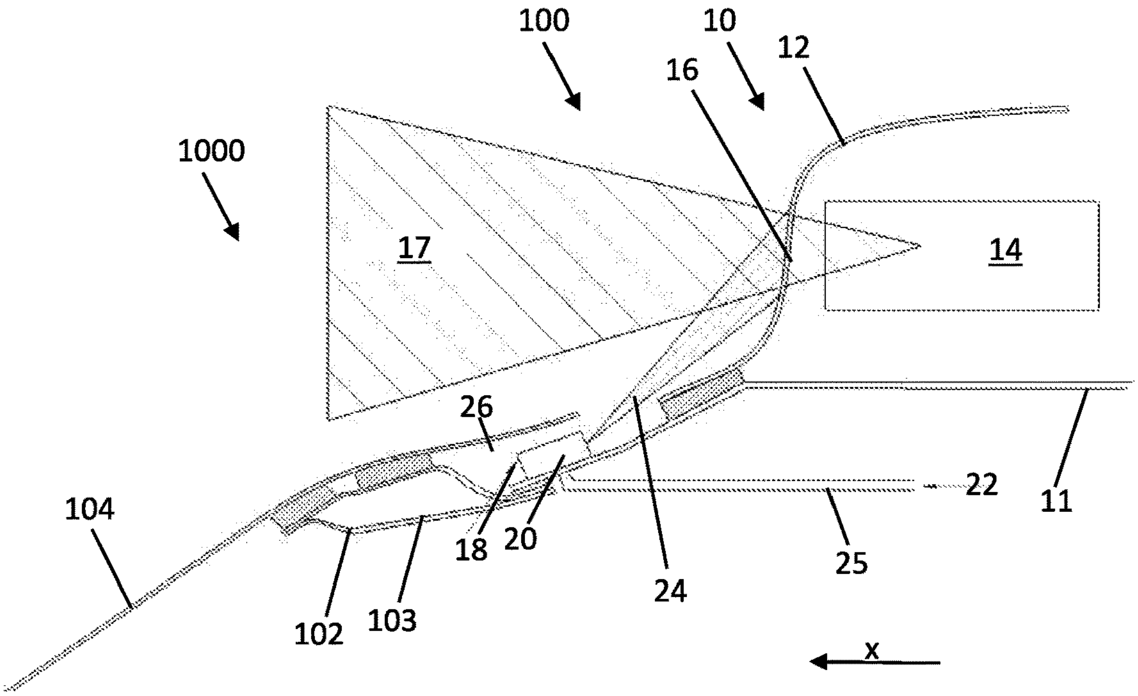
FIG. 7 shows a seventh exemplary embodiment of the vehicle according to the invention.
Figure 8:
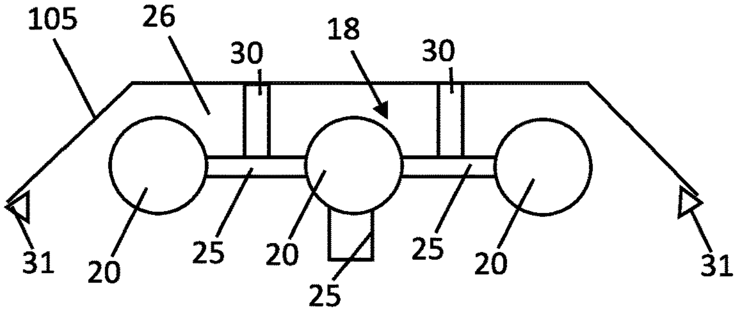
FIG. 8 shows a schematic embodiment of a cleaning feature.
Figure 9:
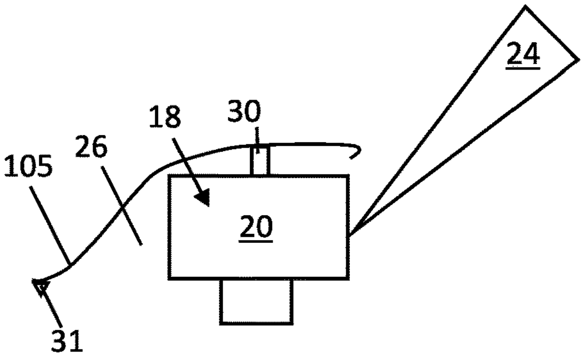
FIG. 9 shows a schematic embodiment of a cleaning feature.
Figure 10:
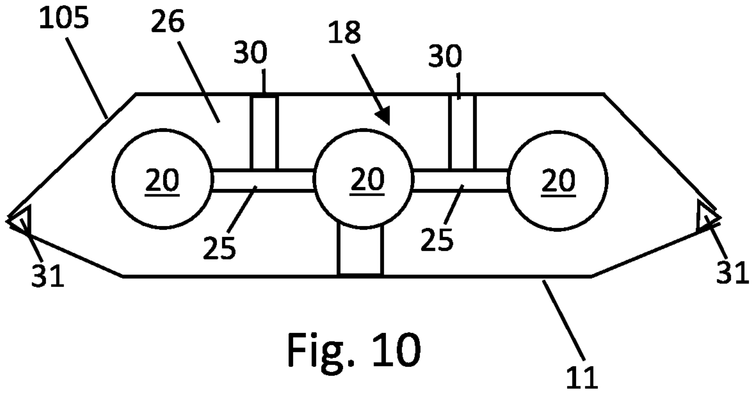
FIG. 10 shows a schematic embodiment of a cleaning feature.

As shown in FIG. 7, the windshield 104 is glued to the transverse rail 103, which forms the front header. In this case, the windshield 104 protrudes over the transverse rail 103 or over the mounting flange of the transverse rail 103 on one side. The panel component 12 is glued to the roof module frame 11. The windshield 104 protrudes over the transverse rail 103 in such a manner that it is spaced apart from the roof module frame 11 in a free end area. This limits the height of the installation space 26. The installation space 26 is thus formed between the windshield 104 and the roof module frame 11. The windshield 104 limits the installation space 26 at the top. The roof module frame 11 limits the installation space 26 at the bottom. Furthermore, the installation space 26 is limited on one side by a part of the transverse rail 103. The installation space 26 is open in the direction of the see-through area 16. The cleaning nozzle 20 is disposed within the installation space 26 and oriented in the direction of the see-through area 16. The cleaning nozzle 20 is attached to the roof module frame 11, in particular inserted through an opening in the roof module frame 11. The cleaning nozzle 20 is sealed in a moisture-tight manner with respect to the roof module frame 11. In principle, other fastening methods for fastening the individual components to one another besides gluing are of course also possible.

FIGS. 8 to 12 show further embodiments of the cleaning feature 18 according to the invention. Here, the cover element 105 forms a wind deflector and/or a wind deflecting element and/or a spoiler at least on the outside. Alternatively, the overlap formed between the at least one window 104 and the roof module frame 11 and/or the panel component 12, and/or at least part of the stepped portion 28 could also form such a wind deflector and/or a wind deflecting element and/or a spoiler.

Figure 11:
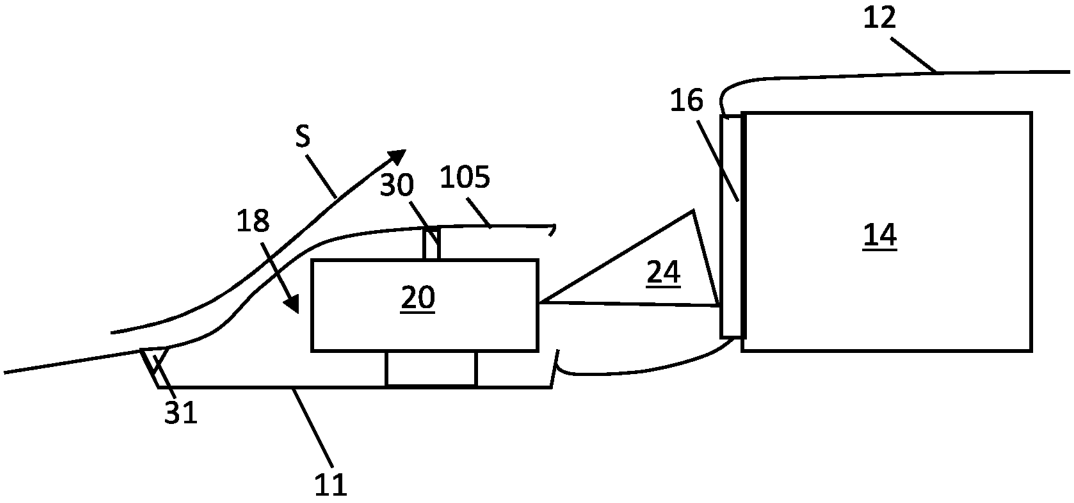
FIG. 11 shows a schematic embodiment of a cleaning feature.
Figure 12:
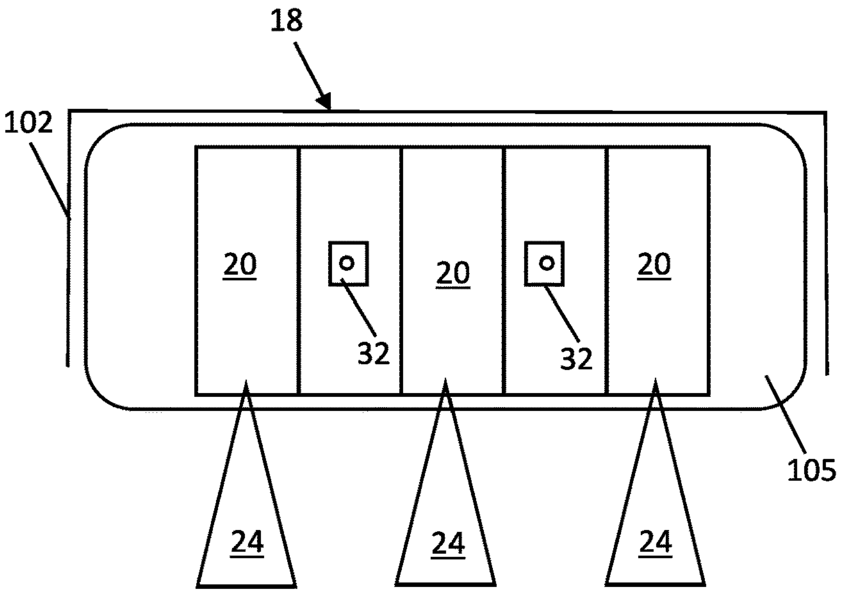
FIG. 12 shows a schematic embodiment of a cleaning feature.

The cover element 105 thus effects an aerodynamic optimization of the air flow around the vehicle 1000, as can be seen schematically in FIG. 11. So the cover element 105 acts as a flow deflecting element which deflects a flow S away from the see-through area 16. The see-through area 16 is thus preferably disposed at least in a low-flow area of the roof with the result that the cleaning effect is not or only slightly influenced by the flow S. The cover element 105 may preferably be connected to the cleaning nozzle 20 via at least one support component 30. Alternatively, the cleaning nozzle can also be at least partially integrated in the cover element 105. At least one seal 31 can be disposed between the cover element 105 and the roof module frame 11 and/or the roof rail 102 and/or the panel component 12, the seal 31 preferably preventing moisture from entering via the cover element 105. A plurality of cleaning nozzles 20 can also be covered by or included in the cover element 105 and/or the panel component 12 and/or the window 104, for example in a series connection (see exemplary FIG. 12). Respective valves 32 can be disposed between the individual cleaning nozzles 20, for example.

The cover element 105 may be disposed on the panel component 12 or on the roof module frame 11 or on the roof rail 102, for example. The roof module 10 may comprise a roof module frame 11 but does not have to comprise such a roof module frame. For example, the roof module 10 may also be disposed on a roof body portion, in particular on the at least one roof rail 102 of the vehicle 1000.

Figure 13:
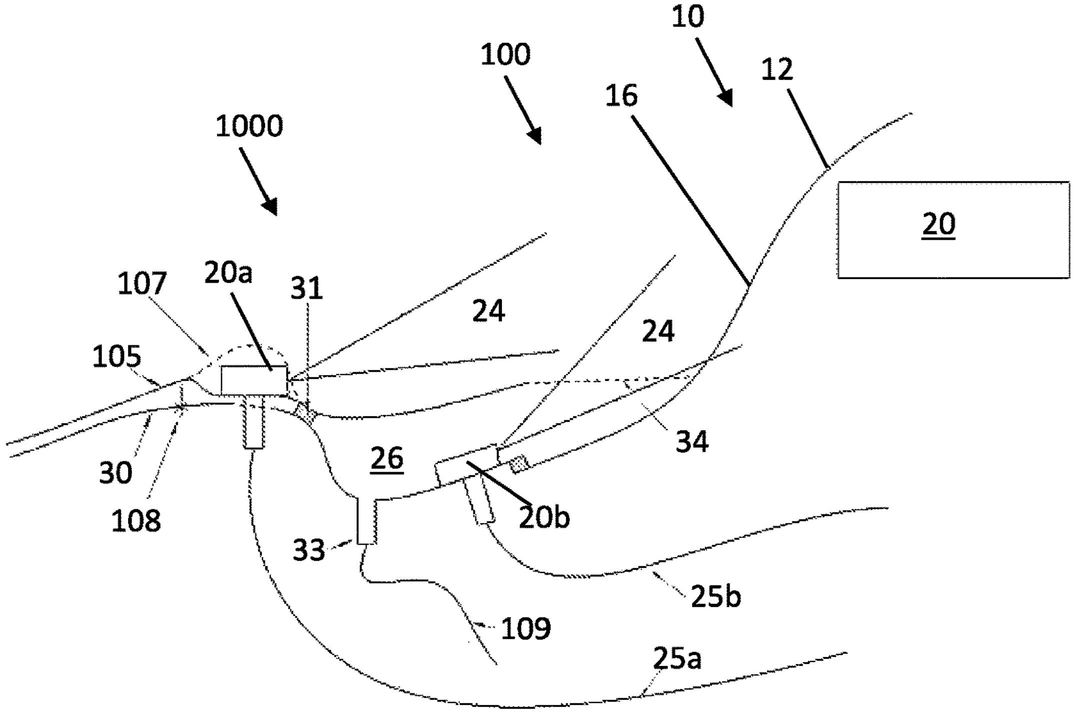
FIG. 13 shows a schematic embodiment of a cleaning feature.
Figure 14:
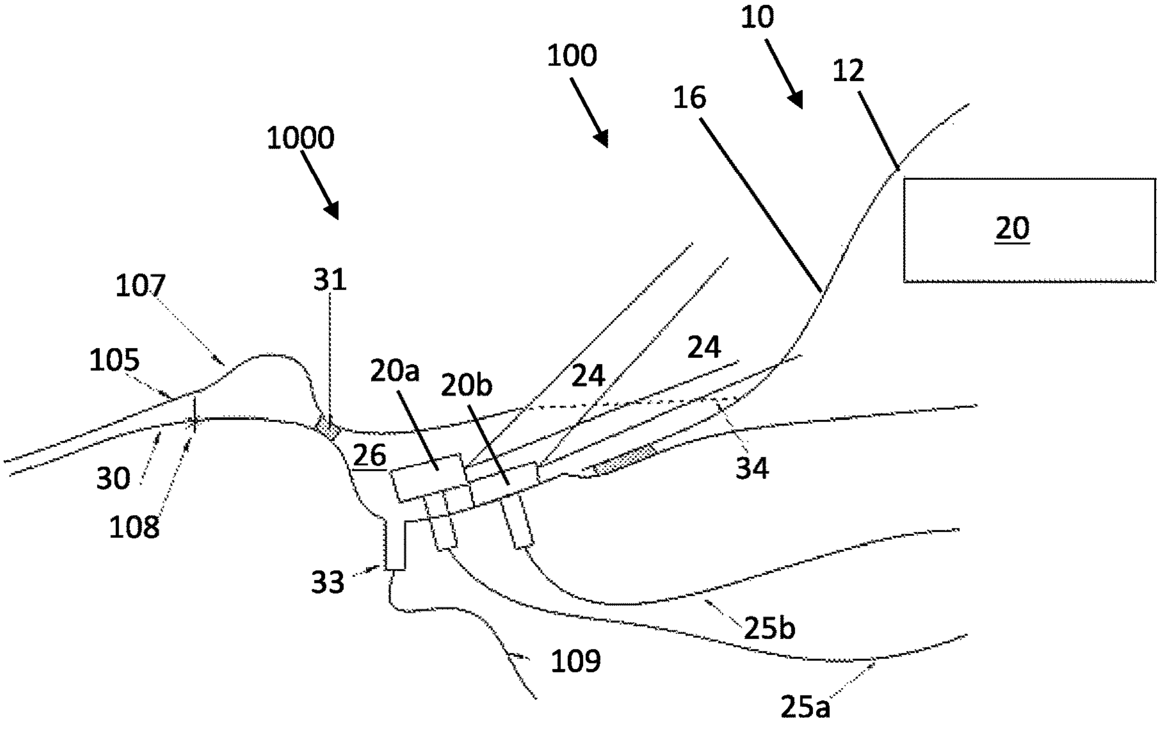
FIG. 14 shows a schematic embodiment of a cleaning feature.

FIGS. 13 and 14 show further embodiments of the motor vehicle 1000 according to the invention and the cleaning features 10. According to FIGS. 13 and 14, a cleaning nozzle 20*a* (two cleaning nozzles are shown here) is disposed on the support component 30, for example. The support component 30 forms a mounting cover and/or a mounting platform for the at least one cleaning nozzle 20*a*, for example. Another cleaning nozzle 20*b*, on the other hand, is disposed on the cover element 105, in particular placed thereon. The cover element 105 comprises an aerodynamic molded portion 107 which can direct an airstream away from the see-through area 16, for example. The cleaning nozzles 20*a*, 20*b* are each connected to a supply line 25*a*, 25*b*. This allows a cleaning fluid to be supplied to each of the cleaning nozzles 20*a*, 20*b*. The molded portion 107 is dashed in the case at hand. The support element 30 is attached to the cover element 105 via at least one attachment point, in particular screwed and/or welded and/or soldered and/or injection-molded on and/or glued. A water outlet 33 is formed on the support component 30 in the case at hand, via which water or moisture that enters the installation space 26 can be discharged from the vehicle 1000 via a discharge line 109. The installation space 26, which is at least partially open in the direction of the see-through area 16, is preferably covered by a net 34. This prevents the ingress of foreign particles, such as dust, dirt particles, leaves or the like.

According to FIG. 14, in contrast to FIG. 13, both cleaning nozzles 20*a*, 20*b* are disposed on the support component 30, which is covered by the cover element 105. Here, too, the cover element 105 forms a molded portion 107 which has an aerodynamic deflection effect, for example for deflecting a driving wind away from the see-through area 16. This can minimize contamination of the see-through area 16, in particular at high driving speeds of the motor vehicle 1000.

It is understood that all features shown and/or described in connection with the exemplary embodiments shown can also be used in any combination and/or on their own to distinguish the subject matter according to the invention from the prior art. In particular, individual features shown in only one of the Figures shown can be applied to other Figures and embodiments without having to adopt all the features described for the embodiment in question. In particular, an isolated extraction of features that are not in a technically necessary operative connection with other features is also possible.

The invention claimed is:

1. A motor vehicle comprising:

at least one roof rail, at least one window, which is connected to the at least one roof rail, and a roof module for forming a vehicle roof of the motor vehicle, the roof module comprising a roof module frame, which is connected to or at least partially forms the at least one roof rail, a panel component, which at least partially forms a roof skin of the vehicle roof, the roof skin serving as an outer sealing surface of the roof module, and which is connected to the roof module frame, an environment sensor configured to send and/or receive electromagnetic signals through a see-through area provided on the panel component so as to detect a vehicle environment, and a cleaning feature having at least one cleaning nozzle and being configured to clean the see-through area, wherein the at least one window and the roof module frame and/or the panel component overlap in such a manner that an installation space is formed between the at least one window and the roof module frame and/or the panel component as a step, and thus said installation space being at least partially open in the direction of the see-through area, the at least one cleaning nozzle being placed below the step in said installation space, or in that a stepped portion is formed in the panel component, the at least one cleaning nozzle being attached to said stepped portion.

2. A motor vehicle comprising:

at least one roof rail, at least one cover element and a roof module for forming a vehicle roof of the motor vehicle, the roof module comprising a roof module frame, which is connected to or at least partially forms the at least one roof rail, a panel component, which at least partially forms a roof skin of the vehicle roof, the roof skin serving as an outer sealing surface of the roof module, and which is connected to the roof module frame, an environment sensor configured to send and/or receive electromagnetic signals through a see-through area provided on the panel component so as to detect a vehicle environment, and a cleaning feature having at least one cleaning nozzle and being configured to clean the see-through area, wherein the at least one cover element and the roof module frame and/or the panel component overlap in such a manner that an installation space is formed between the at least one cover element and the roof module frame and/or the panel component as a step, and thus said installation space being at least partially open in the direction of the see-through area, the at least one cleaning nozzle being placed below the step in said installation space, or in that a stepped portion is formed in the cover element, the at least one cleaning nozzle being attached to said stepped portion.

3. The motor vehicle according to claim 2, wherein the at least one cleaning nozzle is connected to the roof module frame or the panel component or on the roof rail or the cover element within the installation space.

4. A motor vehicle comprising:

at least one roof rail, at least one window, which is connected to the at least one roof rail, and a roof module for forming a vehicle roof of the motor vehicle, the roof module comprising a roof module frame, which is connected to or at least partially forms the at least one roof rail, a panel component, which at least partially forms a roof skin of the vehicle roof, the roof skin serving as an outer sealing surface of the roof module, and which is connected to the roof module frame, an environment sensor configured to send and/or receive electromagnetic signals through a see-through area provided on the panel component so as to detect a vehicle environment, and a cleaning feature having at least one cleaning nozzle and being configured to clean the see-through area, wherein the at least one window and the roof module frame and/or the panel component overlap in such a manner that an installation space is formed between the at least one window and the roof module frame and/or the panel component, said installation space being at least partially open in the direction of the see-through area, the at least one cleaning nozzle being placed in said installation space, or in that a stepped portion is formed in the panel component, the at least one cleaning nozzle being attached to said stepped portion, wherein the at least one cleaning nozzle is inserted through at least one opening in the stepped portion and is attached at least to an inner side of the stepped portion.

5. The motor vehicle according to claim 4, wherein the stepped portion forms a wall which is oriented at an angle with respect to the roof skin.

6. The motor vehicle according to claim 1, wherein the at least one cleaning nozzle is configured to clean the at least one see-through area by a gaseous and/or liquid cleaning fluid.

7. The motor vehicle according to claim 1, wherein if the roof module frame at least partially forms the at least one roof rail, at least one reinforcing and/or stiffening beam with which the roof module frame is at least partially in contact or which is connected to the roof module frame is disposed in the roof area of the motor vehicle.

8. The motor vehicle according to claim 1, wherein the at least one window protrudes over the at least one roof rail in such a manner that the window overlaps with the roof module frame and/or the panel component surface-wise.

9. The motor vehicle according to claim 2, wherein the at least one cover element protrudes over the at least one roof rail in such a manner that the cover element overlaps with the roof module frame and/or the panel component surface-wise.

10. The motor vehicle according to claim 1, wherein the window is glued to the roof rail or the panel component and/or attached thereto by overmolding and/or foaming.

11. The motor vehicle according to claim 2, wherein the at least one cleaning nozzle is fastened in the installation space or to the stepped portion directly and/or indirectly, and/or the at least one cleaning nozzle is injection-molded onto the panel component and/or the cover element and/or the roof module frame and/or the roof rail and/or comprised by the panel and/or the cover element and/or the roof module frame and/or the roof rail.

12. The motor vehicle according to claim 2, wherein the at least one cleaning nozzle is at least partially formed integrally on the stepped portion and/or the panel component and/or the cover element and/or the roof module frame and/or the roof rail.

13. The motor vehicle according to claim 1, wherein the at least one environment sensor comprises a lidar sensor and/or a radar sensor and/or a camera sensor and/or a multi-camera sensor and/or an ultrasonic sensor.

14. The motor vehicle according to claim 2, wherein the overlap formed between the at least one window and the roof module frame and/or the panel component, and/or at least part of the stepped portion, and/or the at least one cover element at least externally serves as a wind deflector and/or a wind deflecting element and/or a spoiler.

15. The motor vehicle according to claim 1, wherein the at least one window is a windshield.

16. The motor vehicle according to claim 3, wherein the at least one cleaning nozzle is connected in a moisture-tight manner.

17. The motor vehicle according to claim 11, wherein the at least one cleaning nozzle is fastened in the installation space or to the stepped portion directly and/or indirectly, via a support profile.

18. The motor vehicle according to claim 2, wherein the at least one cleaning nozzle is connected to the roof module frame or the panel component or on the roof rail or the cover element within the installation space.

19. The motor vehicle according to claim 2, wherein the at least one cleaning nozzle is inserted through at least one opening in the stepped portion and is attached at least to an inner side of the stepped portion.

* * * * *